(12) United States Patent
Murai et al.

(10) Patent No.: US 9,751,239 B2
(45) Date of Patent: Sep. 5, 2017

(54) METHOD AND DEVICE FOR MOLDING FIBER-REINFORCED PLASTIC MEMBER

(71) Applicant: MITSUBISHI AIRCRAFT CORPORATION, Aichi (JP)

(72) Inventors: Tomohiro Murai, Tokyo (JP); Hiroshi Tokutomi, Tokyo (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 463 days.

(21) Appl. No.: 14/291,214

(22) Filed: May 30, 2014

(65) Prior Publication Data
US 2014/0353876 A1    Dec. 4, 2014

(30) Foreign Application Priority Data

Jun. 4, 2013  (JP) .................................. 2013-117438

(51) Int. Cl.
| | | |
|---|---|---|
| *B29C 33/00* | (2006.01) | |
| *B29C 70/48* | (2006.01) | |
| *B29C 70/30* | (2006.01) | |
| *B29L 31/00* | (2006.01) | |
| *B29C 33/38* | (2006.01) | |
| *B29K 105/06* | (2006.01) | |

(52) U.S. Cl.
CPC .............. *B29C 33/00* (2013.01); *B29C 70/30* (2013.01); *B29C 70/48* (2013.01); *B29C 33/38* (2013.01); *B29K 2105/06* (2013.01); *B29K 2905/02* (2013.01); *B29K 2905/12* (2013.01); *B29K 2995/0012* (2013.01); *B29L 2031/003* (2013.01)

(58) Field of Classification Search
CPC ..... B29C 33/3807; B29C 70/30; B29C 70/48; B29C 33/0088; B29C 2033/385; B29C 70/446; B29C 2043/3626
See application file for complete search history.

(56) References Cited

U.S. PATENT DOCUMENTS

| | | | | |
|---|---|---|---|---|
| 1,965,716 | A * | 7/1934 | Thoms | B21D 11/18 72/377 |
| 4,633,632 | A * | 1/1987 | Sarh | B21J 15/142 52/245 |
| 4,726,924 | A * | 2/1988 | Mittelstadt | B29B 15/08 156/180 |

(Continued)

FOREIGN PATENT DOCUMENTS

JP         2007-8147 A    1/2007

*Primary Examiner* — Matthew Daniels
(74) *Attorney, Agent, or Firm* — Pearne & Gordon LLP

(57) ABSTRACT

The molding method of the present invention configures: a mandrel 2 being a mold for molding the material of a fiber-reinforced plastic 1 and having multiple pieces 21 to 24 adjacent to one another in a longitudinal direction D; and an angle material 3 formed of a material having a linear expansion coefficient approximate to the linear expansion coefficient of the fiber-reinforced plastic, and aligning the pieces 21 to 24 along the longitudinal direction D. The method includes: a mandrel disposing step S2 of disposing the pieces 21 to 24 with gaps G1 to G3 between one another; an angle material disposing step S3 of disposing the angle material 3 on the pieces 21 to 24; and a heating to cure and molding step S5 of molding the fiber-reinforced plastic by heating the material of the fiber-reinforced plastic while aligning the pieces 21 to 24 by the angle material 3.

5 Claims, 4 Drawing Sheets

(56) References Cited

U.S. PATENT DOCUMENTS

| | | | | |
|---|---|---|---|---|
| 5,340,301 | A | * | 8/1994 | Saffire ............... B29C 53/22 162/296 |
| 5,538,589 | A | * | 7/1996 | Jensen ............... B29C 69/004 100/211 |
| 2001/0035249 | A1 | * | 11/2001 | Kondo ............... B29C 70/345 156/65 |
| 2010/0102482 | A1 | * | 4/2010 | Jones ............... B29C 33/307 264/320 |
| 2010/0239865 | A1 | * | 9/2010 | Kallinen ............... B29C 70/46 428/411.1 |
| 2010/0314042 | A1 | * | 12/2010 | Luebbering ............... B29C 33/405 156/286 |
| 2013/0049258 | A1 | * | 2/2013 | Rotter ............... B29C 70/462 264/255 |

* cited by examiner

METHOD AND DEVICE FOR MOLDING FIBER-REINFORCED PLASTIC MEMBER

BACKGROUND OF THE INVENTION

Field of the Invention

The present invention relates to a method for molding a fiber-reinforced plastic member and a device for molding a fiber-reinforced plastic member.

Description of the Related Art

Being lightweight and excellent in mechanical strength, fiber-reinforced plastics (FRPs) are used for structural members of an aircraft and the like.

For example, a stringer reinforcing a skin of an aircraft is also formed of FRPs. The stringers are provided at intervals parallel to one another on the back surface of the skin. A molding jig called a mandrel is used for molding the stringer as shown in Japanese Patent Laid-Open No. 2007-8147.

A fiber base material is pressed by the mandrel against the skin or the mold, and a resin, which impregnates the fiber base material, is heated and cured through the mandrel. Thus, a molded article can be obtained.

In Japanese Patent Laid-Open No. 2007-8147, the mandrel is formed in a shape that follows the shape of the skin, or the mandrel divided into multiple pieces is used, in order to mold the stringer in close contact with the skin which has a varying thickness.

In view of the heating step the mandrel undergoes during molding, it is preferable that the FRP of the same material as the molded article, or Invar having as low a thermal expansion coefficient as the FRP, is used as the material of the mandrel, which, however, makes the mandrel expensive.

Therefore, it is desirable to use an inexpensive material such as aluminum, despite its higher thermal expansion coefficient compared with the FRP. However, even when the dimensions of the mandrel are set so as to match the dimensions of the molded article upon elongation of the mandrel, a large dimensional difference between the FRP and the mandrel at a normal temperature makes it difficult to contain the fiber base material inside the mandrel, so that a good positional accuracy and internal quality cannot be obtained.

In that case, by dividing the mandrel into multiple pieces in the longitudinal direction of the stringer and arranging these pieces with a gap between one another, the dimensional difference can be absorbed by the gaps.

However, if the mandrel is divided, the form accuracy of the molded article degrades due to the positional shift of the pieces.

Japanese Patent Laid-Open No. 2007-8147 does not describe how to secure the form accuracy of the stringer when the divided mandrel is used.

On the basis of the above problem, the present invention aims to provide a method for molding a fiber-reinforced plastic member, which can secure the form accuracy required for the molded article while allowing inexpensive production of a molding jig, and a device used for molding a fiber-reinforced plastic.

SUMMARY OF THE INVENTION

A method for molding a fiber-reinforced plastic member of the present invention is a method for molding a fiber-reinforced plastic member having a longer dimension in a longitudinal direction than in a direction perpendicular to the longitudinal direction, the method configuring: a first molding jig which is a mold for molding a fiber-reinforced plastic material and has multiple pieces adjacent to one another in the longitudinal direction; and a second molding jig which is formed of a material having a linear expansion coefficient approximate to the linear expansion coefficient of the fiber-reinforced plastic, and which aligns the pieces of the first molding jig along the longitudinal direction, wherein the method includes: a first molding jig disposing step of disposing the pieces of the first molding jig with a gap between one another; a second molding jig disposing step of disposing the second molding jig on the first molding jig; and a molding step of molding the fiber-reinforced plastic by heating the fiber-reinforced plastic material while aligning the pieces by the second molding jig.

In the present invention, the first molding jig, which is the mold for the fiber-reinforced plastic member, and the second molding jig, which is formed of a material having a linear expansion coefficient approximate to the linear expansion coefficient of the FRP forming the fiber-reinforced plastic, are used in combination.

Then, the first molding jig is divided into multiple pieces in the longitudinal direction and disposed with a gap between one another, and the pieces are aligned in the longitudinal direction by the second molding jig.

According to the present invention, the dimensional difference between the FRP and the first molding jig attributable to the difference in the linear expansion coefficient is absorbed by the gap between the pieces. Therefore, since the pieces of the first molding jig are aligned, it is possible to secure the form accuracy of the molded fiber-reinforced plastic member while using an inexpensive material, such as aluminum, which has a different linear expansion coefficient from that of the FRP or Invar, for the first molding jig.

Here, while the first molding jig is required to surround the material of the fiber-reinforced plastic member, the second molding jig only needs to partially contact the pieces in order to align the pieces of the first molding jig. Accordingly, the second molding jig can be configured with a smaller volume compared with the first molding jig, and the weight of the second molding jig is smaller than that of the first molding jig when they are made of the same material. Therefore, even when the second molding jig is formed of Invar, if the first molding jig is formed of an inexpensive material, the entire molding jig combining the first molding jig and the second molding jig can be produced inexpensively.

Moreover, the second molding jig can be configured into a simple shape compared with the first molding jig, which is the mold, so that the production cost of the second molding jig when formed of an FRP is less expensive than that of the first molding jig. Therefore, even when the second molding jig is formed of an FRP, if the first molding jig is formed of a metal material which requires a low machining cost, the entire molding jig can be produced inexpensively.

In addition to the above advantages, reduction in the molding cycle time required for curing or solidifying the member and energy saving can be realized, now that a material with a low heat capacity and high thermal conductivity, such as aluminum, instead of Invar having a large heat capacity, can be used as the material of the first molding jig.

In the method for molding a fiber-reinforced plastic member of the present invention, it is preferable that the pieces disposed at both ends in the longitudinal direction are retained in the longitudinal direction by the second molding jig.

In this way, elongation of the pieces in the longitudinal direction can be directed toward the center of the first molding jig in the longitudinal direction, and thereby the pieces can be brought closer to one another. As a result, the gaps between the pieces are closed and the entire length of the molding space inside the first molding jig becomes equal to a defined dimension of the fiber-reinforced plastic member, so that the length accuracy of the fiber-reinforced plastic member can be secured.

Here, it is preferable that the pieces at both ends are allowed to shift relative to the second molding jig in the direction perpendicular to the longitudinal direction. Then, the second molding jig can be prevented from overlapping the pieces at both ends even when the pieces at both ends expand with heat. Thus, the pieces are aligned by the second molding jig while the pieces at both ends are kept retained, so that the form accuracy and the length accuracy can be secured.

In the method for molding a fiber-reinforced plastic member of the present invention, it is preferable that the piece is configured with a first block and a second block which sandwich the fiber-reinforced plastic material, and that the first block and the second block are each formed with a first slope surface which is continuous in the longitudinal direction and forms a substantially L-shape with the other first slope surface when the first block and the second block are joined, while the second molding jig is formed with a second slope surface which is continuous in the longitudinal direction and follows the first slope surface of the first block and another second slope surface which is continuous in the longitudinal direction and follows the first slope surface of the second block.

When the second molding jig is disposed on the first molding jig and the first slope surfaces of the blocks of the first molding jig are respectively brought into contact with the second slope surfaces of the second molding jig, the first block and the second block are pressed toward the mold, etc. by the weight of the second molding jig, and at the same time, a component of force in the direction of bringing the first block and the second block together from both sides toward the center is generated through the first slope surfaces and the second slope surfaces. Due to this component of force, the pieces can be pressed from both sides and aligned while the first block and the second block are pressurized in the direction of closing the gap between them.

In the method for molding a fiber-reinforced plastic member of the present invention, it is preferable that the dimension of the gap between the pieces is determined according to the proportion of the dimensions in the longitudinal direction of the pieces which form the gap.

In this way, the difference in amount of elongation attributable to the difference in length among the pieces can be dealt with, and the gaps can be efficiently and reliably closed.

In the method for molding a fiber-reinforced plastic member of the present invention, it is preferable that the dimension of the piece corresponding to a place where the shape of the fiber-reinforced plastic member changes in the longitudinal direction is set to be shorter than the dimension of the pieces corresponding to other places.

For example, when the thickness of the fiber-reinforced plastic member changes in the longitudinal direction and a step is formed, a step is also formed in the piece of the first molding jig. In this case, as the step formed in the piece is engaged with the step of the shaped material of the fiber-reinforced plastic member or the step of the mold, the position of that piece in the longitudinal direction is retained.

Therefore, by making the length of this piece shorter, the proportion accounted for by the lengths of the other pieces in the entire length of the first molding jig is made larger.

Then, the entire length of the first molding jig can be made equal to the defined dimension by sufficiently closing the gaps by elongation of the other pieces in the longitudinal direction.

A device used for molding a fiber-reinforced plastic of the present invention is a device for molding a fiber-reinforced plastic member having a longer dimension in a longitudinal direction than in a direction perpendicular to the longitudinal direction, the device including: a first molding jig which is a mold for molding a fiber-reinforced plastic material and has multiple pieces adjacent to one another in the longitudinal direction; and a second molding jig which is formed of a material having a linear expansion coefficient approximate to the linear expansion coefficient of the fiber-reinforced plastic, and which aligns the pieces of the first molding jig in the longitudinal direction.

In the present invention, before heating of the fiber-reinforced plastic material, the pieces of the first molding jig is disposed with a gap between one another, and during heating of the fiber-reinforced plastic material, the pieces are kept in alignment.

According to the present invention, as with the molding method described above, while an inexpensive material, such as aluminum, which has a different linear expansion coefficient from that of the FRP or Invar is used to the first molding jig, the pieces of the first molding jig are aligned, so that the form accuracy of the molded fiber-reinforced plastic member can be secured.

In the device for molding a fiber-reinforced plastic member of the present invention, it is preferable that the pieces disposed at both ends in the longitudinal direction are retained in the longitudinal direction relative to the second molding jig.

Then, as with the molding method described above, the gaps between the pieces are closed, and the entire length of the molding space inside the first molding jig becomes equal to the defined dimension of the fiber-reinforced plastic member, so that the length accuracy of the fiber-reinforced plastic member can be secured.

According to the present invention, it is possible to secure the form accuracy required for the molded article while allowing inexpensive production of the molding jig.

DETAILED DESCRIPTION OF THE PREFERRED EMBODIMENT

In the following, an embodiment according to the present invention will be described with reference to the accompanying drawings.

In this embodiment, a stringer, which is a fiber-reinforced plastic member, is molded by using a molding device including a mandrel being a first molding jig and an angle material being a second molding jig.

Figure 1:
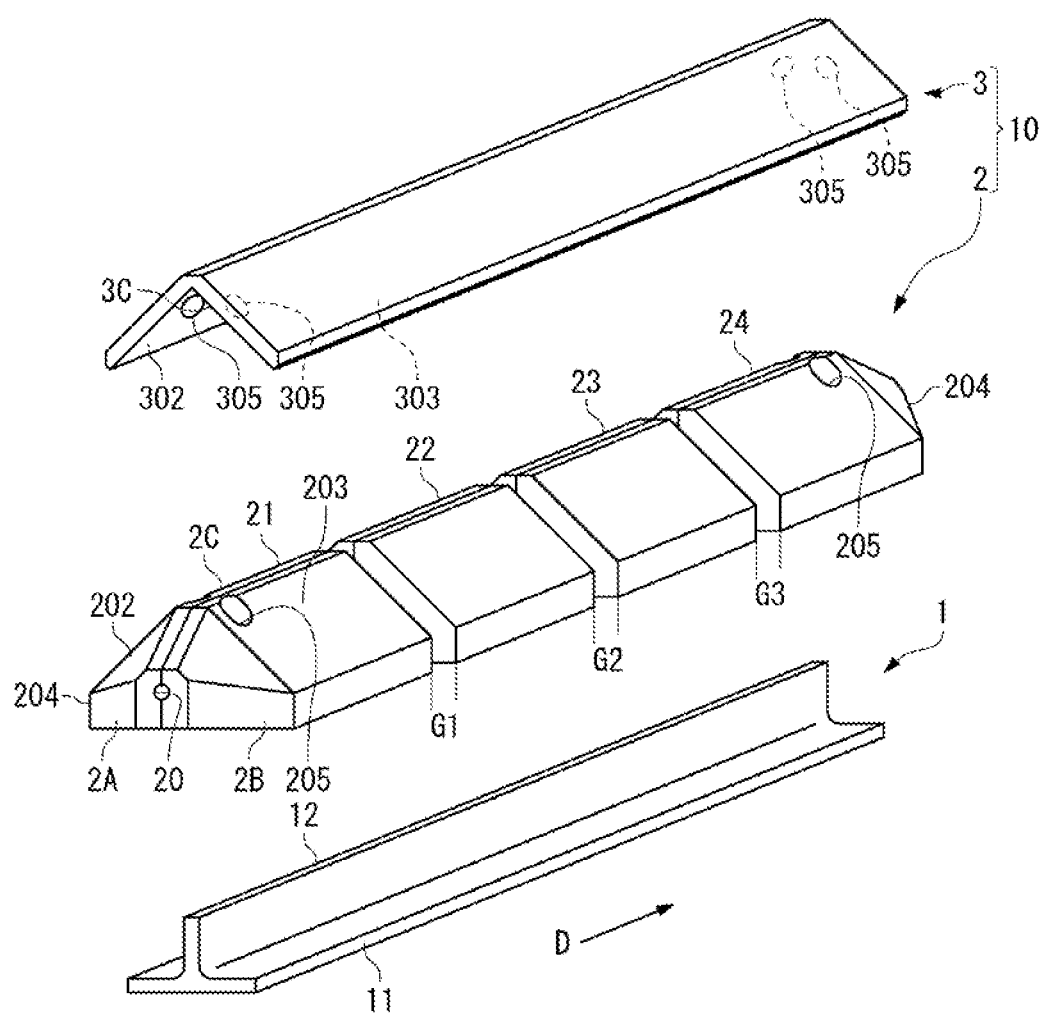
FIG. 1 is an oblique view showing a mandrel and an angle material according to an embodiment of the present invention.

As shown in FIG. 1, a stringer 1 of this embodiment is a member with a T-shaped cross-section, and the stringer 1 has a longer dimension in a longitudinal direction D, in which it extends, than in a cross-sectional direction perpendicular to the longitudinal direction D.

The stringer 1 includes a flange 11 to be bonded to a skin 4 (FIG. 2), and a web 12 extending upward from the center in a width direction of the flange 11.

The multiple stringers 1 are provided parallel to one another on the back surface of the skin 4 and thereby reinforce the skin 4. A high straightness is required for the stringer 1.

Figure 2:
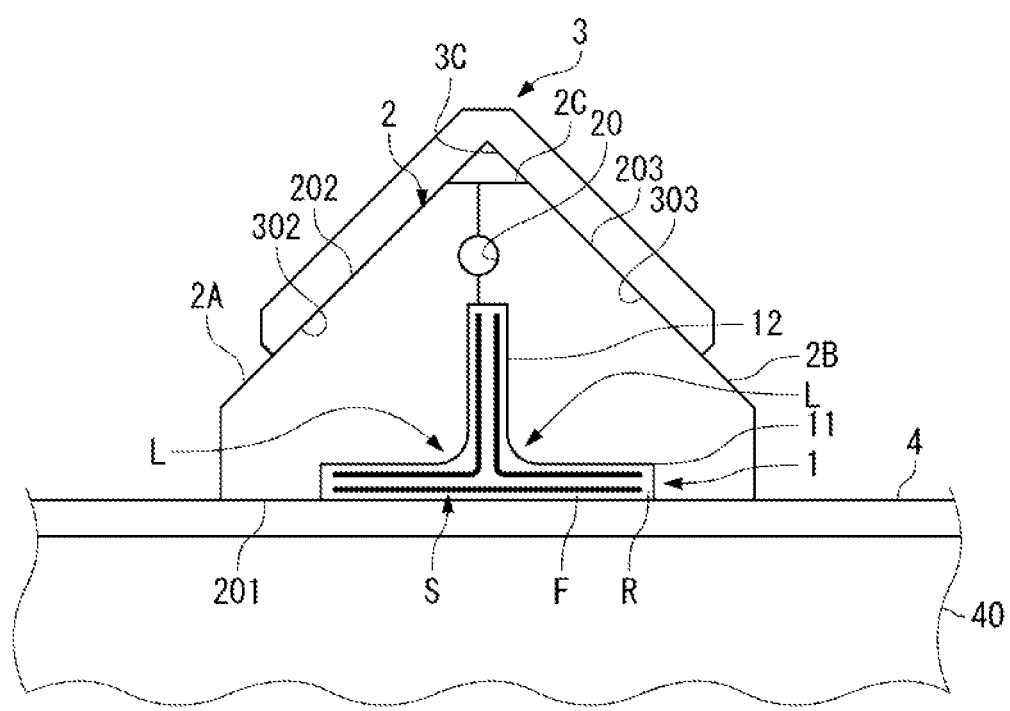
FIG. 2 is a transverse cross-sectional view showing the mandrel and the angle material.

As schematically shown in FIG. 2, the fiber-reinforced plastic (FRP) which forms the stringer 1 is constituted of a fiber base material F and a resin R.

The fiber base material F is formed in a sheet shape, and the required number of the sheets are stacked according to the plate thickness of the stringer 1. Any fiber, such as carbon fiber or glass fiber, can be used as the fiber base material F.

The resin R impregnating the fiber base material F is a thermosetting resin which cures by being heated. A thermosetting resin, for example, epoxy, vinylester, unsaturated polyester, phenol, or bismaleimide, etc. can be used as the resin R. Besides these, a thermoplastic resin which is solidified by being heated, such as nylon, PPS (polyphenylene sulfide), PEEK (polyether ether ketone), or polycarbonate, etc. can also be used.

In this embodiment, the vacuum assisted resin transfer molding (VaRTM) is performed to mold the fiber-reinforced plastic. That is, an enclosed space is depressurized to a predetermined degree of vacuum by evacuating the air to thereby assist the resin injection, and the fiber base material F and the resin R are compressed by the differential pressure between the pressure inside the depressurized space and the atmospheric pressure.

Next, the mandrel 2 and the angle material 3 which constitute a molding device 10 used for molding the stringer 1 will be described.

The mandrel 2, which is a mold for molding the stringer 1, is formed of aluminum or an aluminum alloy, and includes multiple pieces 21 to 24 adjacent to one another in the longitudinal direction D in which the stringer 1 extends. The number of pieces can be any number.

First, the basic configuration of the mandrel 2 will be described.

The mandrel 2 presses the fiber-reinforced plastic material (raw material), which is used for molding the stringer 1, against the skin 4.

As shown in FIG. 2, the mandrel 2 is formed in a substantially triangular shape in cross-section which corresponds to a triangle by the vertices at both ends in the width direction of the flange 11 and the tip of the web 12 of the stringer 1, and the mandrel 2 includes a bottom surface 201 and two slope surfaces 202 and 203 (first slope surfaces). The bottom surface 201 and the slope surfaces 202 and 203 are continuous in the longitudinal direction D. The bottom surface 201 is disposed on the back surface of the skin 4.

The mandrel 2 is divided into two parts, a block 2A (first block) and a block 2B (second block), one on each side of the web 12. When the block 2A and the block 2B are joined, the slope surfaces 202 and 203 assume a substantially L-shape.

The fiber-reinforced plastic material is disposed in a molding space S between the block 2A and the block 2B. In this embodiment, the liquid resin R is injected from the outside to the fiber base material F which is disposed between the block 2A and the block 2B. For this purpose, a resin injection passage 20 leading to the molding space S is formed in the joint surfaces of the block 2A and the block 2B.

During molding, the pieces 21 to 24 are disposed with gaps G1 to G3 between one another as shown in FIG. 1. The dimensional difference among the mandrel 2, the fiber base material F, and the angle material 3, which is caused when the pieces 21 to 24 are elongated in the longitudinal direction D due to the heat applied during molding, is absorbed by these gaps G1 to G3. The total dimension of the lengths of the pieces 21 to 24 is set to be smaller than the length of the fiber base material F by the amount of the dimensional difference.

Of the pieces 21 to 24, the pieces 21 and 24 disposed at both ends are each provided with a piece end 204 for closing the molding space S. The above-mentioned injection passage 20 passes through the piece end 204 along the longitudinal direction D and is connected to a supply source of the resin.

In addition, long holes 205 for retaining the pieces 21 and 24 in the longitudinal direction D are formed in the pieces 21 and 24.

The long hole 205 is formed in each of the slope surfaces 202 and 203 of the piece 21 and in each of the slope surfaces of 202 and 203 of the piece 24. In each of the slope surfaces 202 and 203, the long hole 205 extends from near the vertex corresponding to the tip of the web 12 along the direction perpendicular to the longitudinal direction D.

The long hole 205 is formed in a semicircular shape in transverse cross-section perpendicular to the longitudinal direction D. In addition, the both ends of the long hole 205 are chamfered into a curved surface.

The angle material 3 is a member having an L-shaped cross-section and extending along the longitudinal direction D of the stringer 1, and is disposed on the mandrel 2.

The angle material 3 is formed of Invar, which is an iron-nickel alloy, or of an FRP, as a single member from one end to the other end. Invar has a linear expansion coefficient approximate to the linear expansion coefficient of the FRP, which is the material of the stringer 1, in a wide temperature range including temperatures near the normal temperature, and the temperature at which the resin R is heated lies in a temperature range where the linear expansion coefficient of Invar is low. Other materials having a linear expansion coefficient approximate to that of the FRP can also be used to form the angle material 3.

Here, a linear expansion coefficient within a range of up to about $\pm 3 \times 10^{-6}$ of the linear expansion coefficient of the FRP which is the material of the stringer 1 can be considered as approximate. Depending on the fiber type and the stacked constitution, the linear expansion coefficient of the FRP ranges from about $-1 \times 10^{-6}$ up to about $4.4 \times 10^{-6}$. The linear expansion coefficient of the FRP in this embodiment is, for example, $1.6 \times 10^{-6}$.

From the viewpoint of pressing the mandrel 2 and the fiber base material F, the angle material 3 is preferably formed of a metal with a high specific gravity.

Because of the linear expansion coefficient of the material, the angle material 3 does not easily expand with heat just like the FRP. Since the angle material 3 serves as the reference for the dimension and the shape of the mandrel 2, it is preferably formed to high accuracy by cutting work, etc. The angle material 3 has as a high straightness as required for the stringer 1 along the longitudinal direction D of the stringer 1.

The inner angle of the angle material 3 is equal to the angle of the vertex of the mandrel 2, and a corner part 3C of the angle material 3 closely engages with a corner part 2C of the vertex of the mandrel 2. Then, the inner slope surfaces 302 and 303 (second slope surfaces) of the angle material 3 respectively come into contact with the entire slope surfaces 202 and 203 of the pieces 21 to 24 of the mandrel 2. The angle material 3 functions to close the gap between the blocks 2A and 2B of the pieces 21 to 24 by pressing the pieces 21 to 24 from both ends in the width direction, as well as to align the pieces 21 to 24 along the longitudinal direction D.

A protrusion 305 which is inserted into the long hole 205 is formed at both ends in the longitudinal direction D of the angle material 3. By the protrusion 305 being inserted into the long hole 205, the angle material 3 retains the pieces 21 and 24 in the longitudinal direction D, and thereby also functions to determine the entire length of the mandrel 2.

As opposed to this embodiment, the protrusion may be formed in the pieces 21 and 24 while the long hole may be formed in the angle material 3.

The protrusion 305 is formed in each of the slope surfaces 302 and 303 at one end and the other end of the angle material 3.

The protrusion 305 projects in a semispherical shape from the slope surfaces 302 and 303.

When the pieces 21 and 24 expand with heat, the protrusion 305 and the long hole 205 are allowed to shift relative to each other along the long hole 205.

The protrusion 305 and the long hole 205 both have a shape rounded in every direction on the outer periphery. Thus, when the angle material 3 is disposed on the mandrel 2, the protrusions 305 of the angle material 3 can be smoothly inserted into the long holes 205 without catching on the pieces 21 and 24.

Next, a method for molding the stringer 1 will be described with reference also to FIG. 3.

In the following, the multiple stringers 1 are molded on the skin 4 at once.

First, the fiber base material F, which is the material of the stringer 1, is disposed at a predetermined position on the back surface of the skin 4 which is disposed on a mold 40 (FIG. 2) (fiber base material disposing step S1). At this time, a so-called preform fiber base material F, which is previously molded into a shape with a T-shaped cross-section, can be disposed. A thermosetting adhesive formed in a film shape is interposed between the fiber base material F and the skin 4.

Next, the fiber base material F is sandwiched between the blocks 2A and 2B of the mandrel 2 and pressed against the skin 4.

Figure 4A:
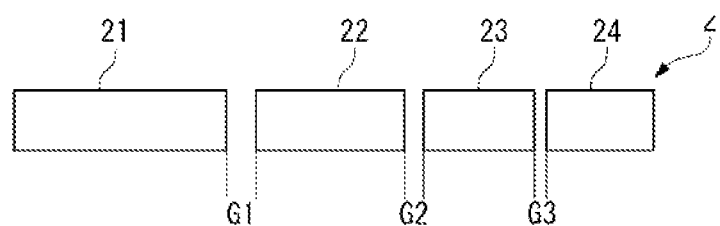
FIGS. 4A-4C are views for illustrating a length and a gap of a piece of the mandrel.

At this time, as shown in FIG. 4A, the pieces 21 to 24 of the mandrel 2 are disposed with the gaps G1 to G3 between one another (mandrel disposing step S2). Here, the gaps G1 to G3 can be set accurately by inserting shims, which are produced to a thickness corresponding to the dimension of the respective gaps G1 to G3, into the gaps between the pieces 21 to 24.

Subsequently, the angle material 3 is disposed on the mandrel 2 (angle material disposing step S3). At this time, the protrusions 305 at one end of the angle material 3 are inserted into the long holes 205 of the piece 21 of the mandrel 2, and the protrusions 305 at the other end of the angle material 3 are inserted into the long holes 205 of the piece 24. This brings the slope surfaces 302 and 303 of the angle material 3 into contact with the slope surfaces 202 and 203.

When the protrusions 305 are inserted into the long holes 205, both the pieces 21 and 24 are retained in the longitudinal direction D by the angle material 3.

In addition, the slope surfaces 202 and 203 of the pieces 21 to 24 are pressed by the slope surfaces 302 and 303 of the angle material 3 from both sides in the width direction. Thus, even when the direction of the pieces 21 to 24 is not in alignment with the longitudinal direction D at the time of the mandrel disposing step S2, the pieces 21 to 24 are aligned along the longitudinal direction D of the stringer 1.

Figure 3:
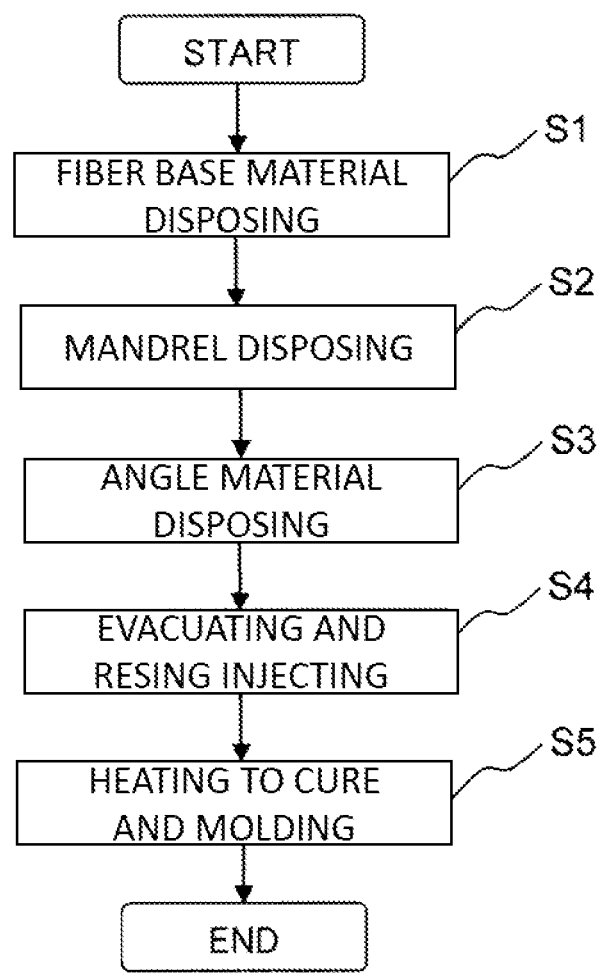
FIG. 3 is a view showing a procedure for molding a stringer.

Further, a bag film (not shown) is put over the mandrel 2 and the angle material 3, and the skin 4, the fiber base material F, the mandrel 2, and the angle material 3 are sealed between the bag film and the mold 40 (FIG. 3). Thereby an enclosed space is created between the bag film and the mold 40. This enclosed space is depressurized by evacuation of the air (evacuating and resin injecting step S4).

As the enclosed space is depressurized, the molding space S between the blocks 2A and 2B of the mandrel 2 is also depressurized. The liquid resin is accordingly injected from a resin supply source (not shown) through the injection passage 20 of the mandrel 2 into the molding space S. The injected resin R impregnates the fiber base material F.

The fiber base material F and the resin R are pressed toward the skin 4 by the weights of the mandrel 2 and the angle material 3, and the differential pressure between the enclosed space and the atmosphere separated by the bag film.

Concurrently with the evacuation of the air, the resin R is heated and cured by a given heat source to mold the fiber-reinforced plastic into the stringer 1 (heating to cure and molding step S5). As the heat source, an oven, a heater mat, an embedded hot-wire heater, a far-infrared heater, or a liquid heating media pipe, etc. can be used.

The mandrel 2 and the angle material 3 are also heated by the heat generated by the heat source. The heating temperature is, for example, 130° C.

While the heat causes the mandrel 2 to expand, the stringer 1 needs to be formed to the defined length and a high straightness. To this end, the angle material 3 is used as the reference for the dimension and the shape of the mandrel 2.

From the viewpoint of obtaining straightness, the pieces 21 to 24 are aligned by pressing the slope surfaces 202 and 203 of the pieces 21 to 24 with the slope surfaces 302 and 303 of the angle material 3.

From the viewpoint of determining the length of the stringer 1, the pieces 21 and 24 at both ends are retained in the longitudinal direction D by inserting the protrusions 305 of the angle material 3 into the long holes 205 of the pieces 21 and 24 at both ends.

Here, while the pieces 21 and 24 disposed at both ends are retained in the longitudinal direction D, they are allowed to shift relative to the angle material 3 in the direction in which the long hole 205 extends, namely, in the direction perpendicular to the longitudinal direction D.

Thus, even when the mandrel 2 expands with heat, the slope surfaces 302 and 303 of the angle material 3 keep pressing the slope surfaces 202 and 203 of the pieces 21 to 24, without the protrusions 305 of the angle material 3 overlapping the outside of the long holes 205 of the pieces 21 and 24. Therefore, the pieces 21 to 24 are aligned by being sandwiched from both sides in the width direction by the angle material 3, and the gap between the blocks 2A and 2B are kept closed.

In the following, determination of the length of the stringer 1 will be described.

Since the length of the stringer 1 is determined by the entire length of the mandrel 2 including the gaps G1 to G3, the dimensions of the gaps G1 to G3 are important. In order to prevent the gaps G1 to G3 from being printed on the molded stringer 1, it is desirable that the gaps G1 to G3 are narrowed, and that the gaps G1 to G3 are fully closed and disappear when the pieces 21 to 24 are elongated.

Suppose now, for example, that only the piece 21 at one end of the mandrel 2 is retained by the angle material 3. In this case, although the differential pressure between the enclosed space and the atmosphere contributes to narrowing the gaps G1 to G3, if the friction between the pieces 21 to 24 and the skin 4 is large, the piece is pushed out by the adjacent piece toward the other end when the pieces 21 to 24 are elongated in the longitudinal direction D, so that the gaps after contraction of the pieces become larger than before heating. Due to the accumulation of the amount of shift attributable to this pushing out, the widening of the gaps becomes more noticeable as the distance from the piece 21 at one end increases.

Therefore, in this embodiment, the pieces 21 and 24 at both ends are retained by the angle material 3 so as to reliably narrow the gaps G1 to G3. As described above, since the long holes 205 of the pieces 21 and 24 and the protrusions 305 of the angle material 3 are allowed to shift relative to each other, even when the pieces 21 and 24 expand with heat, the piece 21 and 24 are kept retained in the longitudinal direction D by the protrusions 305 and the long holes 205.

When the pieces 21 and 24 at both ends are thus retained, the elongation in the longitudinal direction D of the pieces 22 and 23 disposed between the pieces 21 and 24 is limited to the region between the pieces 21 and 24. Then, the elongation in the longitudinal direction D of the pieces 21 to 24 can be directed toward the center of the longitudinal direction D, so that the pieces 21 to 24 can be brought closer to one another.

As a result, as shown in FIG. 4A, the gaps G1 to G3 are closed and the length of the molding space S inside the mandrel 2 from one end to the other end becomes equal to the defined dimension of the stringer 1.

It is preferable that the dimensions of the gaps G1 to G3 is each determined on the basis of the proportion of the dimensions in the longitudinal direction D of the pieces which form the gap.

For example, as shown in FIG. 4A, if the piece 21 disposed at one end is relatively longer than the other pieces, the gap G1 which is formed by the piece 21 and the piece 22 is set to be larger than the other gaps G2 and G3. In the example shown in FIG. 4A, the dimensions of the gaps G1 to G3 become smaller in this order on the basis of the lengths of the pieces 21 to 24. Here, since the gaps G1 to G3 are formed between the adjacent pieces, the gap dimension is set on the basis of the length of each of the two adjacent pieces.

As described above, the difference in amount of elongation attributable to the difference in length among the pieces 21 to 24 can be dealt with by setting the dimension of the gaps G1 to G3 on the basis of the length of each of the pieces 21 to 24, so that the gaps G1 to G3 can be efficiently and reliably closed.

The dimensions of the gaps G1 to G3 can be set on the basis of calculations and tests according to the difference in linear expansion coefficient and heating temperature between the mandrel 2 and the angle material 3.

Once the resin R has cured to a predetermined hardness, the stringer 1 is molded straightly to the defined dimension and integrally bonded on the skin 4.

This completes the molding of the stringer 1.

Thereafter, secondary curing treatment and finishing treatment are performed as necessary.

According to the embodiment described above, the angle material 3, which is formed of a material having a linear expansion coefficient approximate to the linear expansion coefficient of the FRP forming the stringer 1, and the mandrel 2, which is formed of aluminum or an aluminum alloy having a higher linear expansion coefficient than that of the material of the angle material 3, are used in combination to serve as the molding jig.

Then, the mandrel 2 is divided into multiple pieces 21 to 24, and the pieces 21 to 24 are disposed with gaps G1 to G3 between one another and aligned by the angle material 3.

This makes it possible to use an inexpensive material, for example, aluminum, which has a different linear expansion coefficient from that of the FRP or Invar for the mandrel 2, while securing the straightness of the mandrel even when it is divided into the pieces 21 to 24.

Here, the mandrel 2 has a larger volume than the angle material 3, and the mandrel 2 has a larger weight than the angle material 3 when they are formed of the same material. Therefore, even when Invar is used for the angle material 3, if an inexpensive material is used for the mandrel 2, the cost of the entire molding jig combining the mandrel 2 and the angle material 3 can be reduced.

Moreover, the mandrel 2, which is the mold, has a more complicated shape than the angle material 3, so that the production cost of the mandrel 2 when formed of an FRP is higher than that of the angle material 3. Therefore, even when the angle material 3 is formed of an FRP, if the mandrel 2 is formed of a metal material which requires a low machining cost, the cost of the entire molding jig can be reduced.

Since the mandrels 2 respectively corresponding to the many stringers 1 provided on the skin 4 are prepared, a reduction in the production cost of the mandrel 2 has a large cost reduction effect.

In addition to the above advantages, according to this embodiment, the portability of the mandrel 2 is improved by dividing it into the multiple pieces 21 to 24 in the longitudinal direction D, so that the mandrel 2 is easier to handle during the molding and demolding works.

Besides aluminum and an aluminum alloy, the mandrel 2 can also be formed of, for example, titanium, nickel, brass, or stainless steel, etc. However, aluminum and an aluminum alloy have many advantages such as the ease of handling due to its light weight or the lower machining cost.

According to this embodiment, since the pieces 21 and 24 at both ends are retained in the longitudinal direction D by the long holes 205 of the pieces 21 and 24 at both ends and the protrusions 305 of the angle material 3, it is unlikely that the gaps G1 to G3 become too large and make the entire length of the mandrel 2 longer. Thus, the length accuracy of the stringer 1 can be secured.

Here, since the long hole 205 and the protrusion 305 are allowed to shift relative to each other when the pieces 21 to 24 expand with heat, unlike the case where a hole with a circular opening and a protrusion with a circular cross-section to be inserted into the hole are formed, for example, resulting in the angle material 3 overlapping the mandrel 2, the slope surfaces 302 and 303 of the angle material 3 can be kept in contact with the slope surfaces 202 and 203 of the pieces 21 to 24. Thus, the pieces 21 to 24 are aligned by the angle material 3 and the pieces 21 and 24 at both ends are kept retained, so that the requirements for the straightness and the dimensional accuracy of the stringer 1 can be satisfied.

Moreover, since the mandrel 2 is formed with the slope surfaces 202 and 203 and the angle material 3 is formed with the slope surfaces 302 and 303, the mandrel 2 can be pressed against the skin 4, and the pieces 21 to 24 can be kept in alignment while the blocks 2A and 2B of the mandrel 2 are pressurized in the direction of closing the gap between them.

That is, when the angle material 3 is disposed on the mandrel 2, the blocks 2A and 2B are pressed toward the skin 4 by the weight of the angle material 3, and at the same time, a component of force in the direction of bringing the blocks 2A and 2B together from both sides to the center is generated through the slope surfaces 302, 303 and the slope surfaces 202, 203 by the weight of the angle material 3 and the differential pressure at the time of evacuating the air. This component of force causes the blocks 2A and 2B to reliably close the gap between them, as well as presses the pieces 21 to 24 from both sides to keep them in alignment in the longitudinal direction D.

Here, a resultant force of a downward force caused by the weight of the mandrel 2 and a component of force perpendicular to the downward force acts on a corner part L (FIG. 2) formed by the flange 11 and the web 12 of the stringer 1. As the corner part L can be sufficiently compressed by this resultant force, the stringer 1 can be molded into the defined T-shape.

Figure 4B:
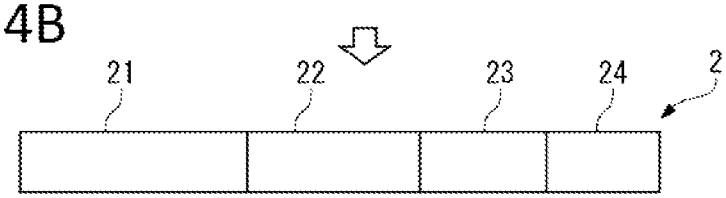
Figure 4C:
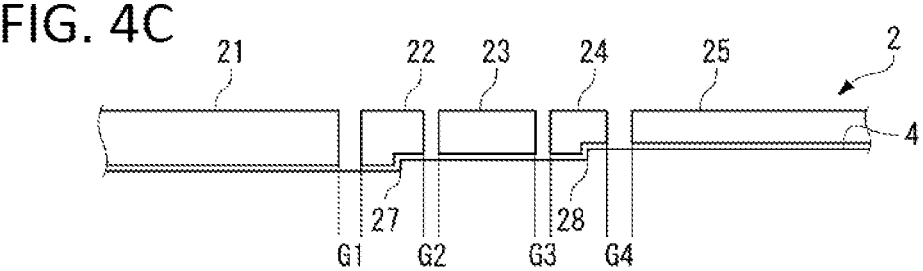

Now, due to the varying plate thickness of the skin 4, where a step is formed in the skin 4, a step is also formed in the stringer 1. Then, as shown in FIG. 4B, the mandrel 2 corresponding to the steps of the skin 4 and the stringer 1 is also formed into a shape which follows the steps. It is preferable that the fiber base material F, which is the material of the stringer 1, is also pre-molded into a shape which follows the steps.

The pieces 22 and 24 disposed on steps 27 and 28 formed in the skin 4 are set to a shorter dimension in the longitudinal direction D than the pieces 21, 23, and 25 disposed on other places.

The step formed in the piece 22 engages with the step 27 of the skin 4. The piece 24 engages with the step 28 of the skin 4. Thus, the positions of the pieces 22 and 24 in the longitudinal direction D are retained.

Therefore, by keeping the lengths of the pieces 22 and 24 shorter, the proportion accounted for by the lengths of the other pieces 21, 23, and 25 in the entire length of the mandrel 2 is made larger. In this way, the gaps G1 to G4 can be sufficiently closed by the elongation of the other pieces 21, 23, and 25 in the longitudinal direction D so that the entire length of the mandrel 2 can match the length of the stringer 1.

For the pieces 22 and 24, the gaps with which they are involved are preferably set to a smaller dimension. For example, the gap G1 between the piece 21 and the piece 22 can be set to a dimension according to the length of the piece 21 in consideration of the small elongation of the retained piece 22.

When a hole for fitting an antenna, etc. is formed in the skin 4, a notch is formed in the stringer 1 so as to avoid the hole, and the mandrel 2 is engaged with the notch of the stringer 1. Also in this case, as with the above case, setting the piece which corresponds to the hole of the stringer 1 shorter is effective.

While in the above embodiment, the stringer 1 is integrally molded on the skin 4, the stringer 1 can also be molded separately from the skin 4. In that case, the fiber base material F and the mandrel 2 can be disposed on the mold.

While in the above embodiment, the stringer 1 is molded into the shape with a T-shaped transverse cross-section, the present invention can be applied for molding a stringer of any shape such as an I-shape, C-shape, L-shape, Z-shape, or J-shape, etc. in transverse cross-section. The configurations of the first molding jig and the second molding jig of the present invention can be determined according to the shape of the stringer. The second molding jig can be, for example, a C-shaped member which has a spring property and presses the first molding jig from both sides.

The present invention is not limited to the above examples, and as long as within the scope of the present invention, it is possible to select some of the configurations described in the above embodiment, or to arbitrarily change some of the configurations into another configuration.

The present invention also encompasses a method of molding the stringer, for example, by placing a weight on the mandrel 2 and the angle material 3, without evacuation of the air.

Moreover, the present invention also encompasses the use of pre-preg instead of the liquid resin R and the fiber base material F.

What is claimed is:

1. A method for molding a fiber-reinforced plastic member having a longer dimension in a longitudinal direction than in a direction perpendicular to the longitudinal direction, the method configuring:
    a first molding jig which is a mold for molding a fiber-reinforced plastic material and has multiple pieces adjacent to one another in the longitudinal direction; and
    a second molding jig which is formed of a material having a linear expansion coefficient approximate to the linear expansion coefficient of the fiber-reinforced plastic, and which aligns the pieces of the first molding jig along the longitudinal direction, wherein the method comprises:
    a first molding jig disposing step of disposing the pieces of the first molding jig with a gap between one another;
    a second molding jig disposing step of disposing the second molding jig on the first molding jig; and
    a molding step of molding the fiber-reinforced plastic by heating the fiber-reinforced plastic material while aligning the pieces by the second molding jig.

2. The method for molding a fiber-reinforced plastic member according to claim 1, wherein the pieces disposed at both ends in the longitudinal direction are retained by the second molding jig in the longitudinal direction.

3. The method for molding a fiber-reinforced plastic member according to claim 2, wherein the pieces disposed at both ends in the longitudinal direction are retained in the longitudinal direction, while being allowed to shift relative to the second molding jig in the direction perpendicular to the longitudinal direction.

4. The method for molding a fiber-reinforced plastic member according to claim 1, wherein
    the piece is configured with a first block and a second block which sandwich the fiber-reinforced plastic material,
    the first block and the second block are each formed with a first slope surface which is continuous in the longitudinal direction, and forms a substantially L-shape with the other first slope surface when the first block and the second block are joined, and
    the second molding jig is formed with a second slope surface which is continuous in the longitudinal direction and follows the first slope surface of the first block, and another second slope surface which is continuous in the longitudinal direction and follows the first slope surface of the second block.

5. A method for molding a fiber-reinforced plastic member having a longer dimension in a longitudinal direction than in a direction perpendicular to the longitudinal direction, the method configuring:
- a first molding jig which is a mold for molding a fiber-reinforced plastic material and has multiple pieces adjacent to one another in the longitudinal direction; and
- a second molding jig which is formed of a material having a linear expansion coefficient approximate to the linear expansion coefficient of the fiber-reinforced plastic, and which aligns the pieces of the first molding jig along the longitudinal direction, wherein the method comprises:
  - a first molding jig disposing step of disposing the pieces of the first molding jig with a gap between one another;
  - a second molding jig disposing step of disposing the second molding jig on the first molding jig; and
  - a molding step of molding the fiber-reinforced plastic by heating the fiber-reinforced plastic material while aligning the pieces by the second molding jig,
  - wherein the dimension of the piece corresponding to a place where the shape of the fiber-reinforced plastic member changes in the longitudinal direction is set to be shorter than the pieces corresponding to other places.

* * * * *